United States Patent
Niu et al.

(10) Patent No.: US 11,109,447 B2
(45) Date of Patent: Aug. 31, 2021

(54) UNLICENSED BAND IOT SYSTEMS

(71) Applicant: Apple Inc., Cupertino, CA (US)

(72) Inventors: Huaning Niu, Milpitas, CA (US);
Wenting Chang, Beijing (CN);
Salvatore Talarico, Sunnyvale, CA (US); Rongrong Sun, Beijing (CN)

(73) Assignee: Apple Inc., Cupertino, CA (US)

( * ) Notice: Subject to any disclaimer, the term of this patent is extended or adjusted under 35 U.S.C. 154(b) by 247 days.

(21) Appl. No.: 16/451,292

(22) Filed: Jun. 25, 2019

(65) Prior Publication Data

US 2019/0313481 A1    Oct. 10, 2019

Related U.S. Application Data

(60) Provisional application No. 62/711,957, filed on Jul. 30, 2018, provisional application No. 62/689,700, filed on Jun. 25, 2018, provisional application No. 62/689,706, filed on Jun. 25, 2018.

(51) Int. Cl.
| | |
|---|---|
| *H04W 88/06* | (2009.01) |
| *H04W 4/80* | (2018.01) |
| *H04W 56/00* | (2009.01) |
| *H04L 5/14* | (2006.01) |
| *H04W 72/04* | (2009.01) |

(52) U.S. Cl.
CPC .......... *H04W 88/06* (2013.01); *H04L 5/1469* (2013.01); *H04W 4/80* (2018.02); *H04W 56/001* (2013.01); *H04W 72/0446* (2013.01)

(58) Field of Classification Search
CPC ..... H04W 88/06; H04W 4/80; H04W 56/001; H04W 72/0446; H04W 16/14; H04W 48/12; H04W 4/70; H04L 5/1469; H04L 5/0048; H04L 5/001; H04L 5/0053; H04L 5/0044
See application file for complete search history.

(56) References Cited

U.S. PATENT DOCUMENTS

| | | | |
|---|---|---|---|
| 2018/0219576 A1* | 8/2018 | Bhattad | H04W 72/0446 |
| 2019/0132817 A1* | 5/2019 | Liu | H04B 1/713 |
| 2019/0174476 A1* | 6/2019 | Chang | H04W 56/001 |
| 2019/0238219 A1* | 8/2019 | Liu | H04W 72/1215 |
| 2019/0254013 A1* | 8/2019 | Chang | H04L 5/00 |
| 2020/0169955 A1* | 5/2020 | Chang | H04W 4/70 |
| 2021/0099944 A1* | 4/2021 | Hoglund | H04L 5/14 |
| 2021/0112590 A1* | 4/2021 | Kim | H04W 74/008 |

\* cited by examiner

*Primary Examiner* — Kiet Tang
(74) *Attorney, Agent, or Firm* — Kowert, Hood, Munyon, Rankin & Goetzel, P.C.

(57) ABSTRACT

Systems and methods of using a frame structure by a NB-IoT UE are described. The UE receives an anchor segment on an anchor channel and a data segment on a data channel both in an unlicensed spectrum. If a 3N1 frame structure is used: a NPSS, NSSS and NPBCH are in a highest index anchor carrier of contiguous anchor carriers and SIB in a lowest index anchor carrier, and if a 3N2 frame structure is used a single narrowband carrier comprising the NPSS, NSSS, NPBCH and SIB. The data channel is a FHSS single carrier other than the anchor carriers if the 3N1 frame structure is used and the single narrowband carrier if the 3N2 frame structure is used. A NPDCCH or NPDSCH is received on a middle index anchor carrier or in the data segment. The NPSS overrides a TDD configuration indicated by the eNB.

20 Claims, 12 Drawing Sheets

UNLICENSED BAND IOT SYSTEMS

This application claims the benefit of priority under 35 U.S.C. 119(e) to U.S. Provisional Patent Application Ser. No. 62/689,700, filed Jun. 25, 2018, to U.S. Provisional Patent Application Ser. No. 62/689,706, filed Jun. 25, 2018, and U.S. Provisional Patent Application Ser. No. 62/711,957, filed Jul. 30, 2018, each of which is incorporated herein by reference in its entirety.

TECHNICAL FIELD

Embodiments pertain to radio access networks (RANs). Some embodiments relate to cellular networks, including Third Generation Partnership Project (3GPP) $5^{th}$ generation (5G) New Radio (NR) (or next generation (NG)) networks. Some embodiments relate to unlicensed band interne of things (IoT) and narrowband IoT (NB-IoT) systems.

BACKGROUND

The use of various types of systems has increased due to both an increase in the types of devices user equipment (UEs) using network resources as well as the amount of data and bandwidth being used by various applications, such as video streaming, operating on these UEs. In particular, the introduction of a massive amount of IoT devices, in which a large number of computing devices are interconnected to each other and to the Internet to provide functionality and data acquisition at relatively low levels, has resulted in a veritable explosion in network use. To increase the ability of the network to contend with this network use, use of the unlicensed band by cellular devices and systems continues to be explored.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
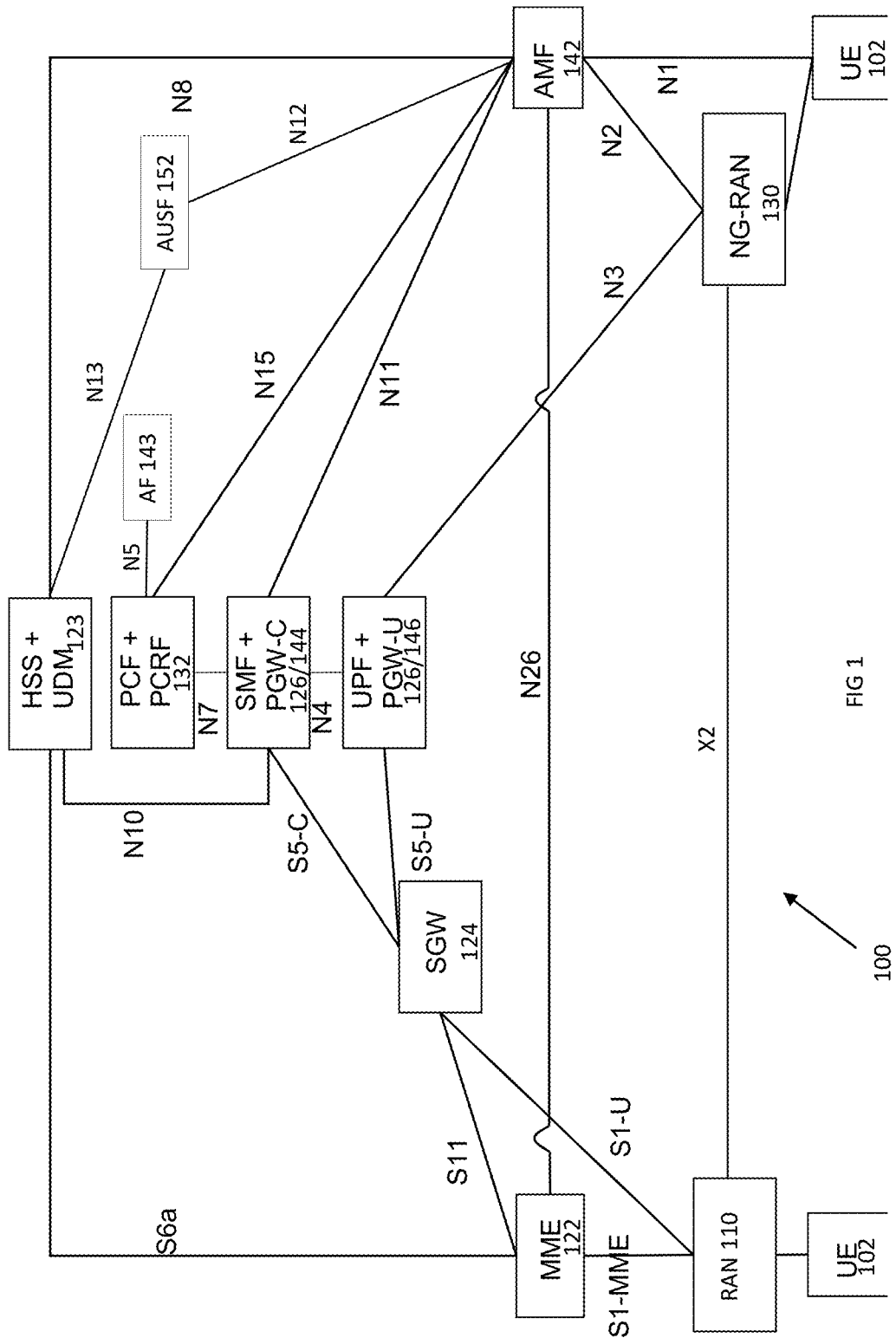
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
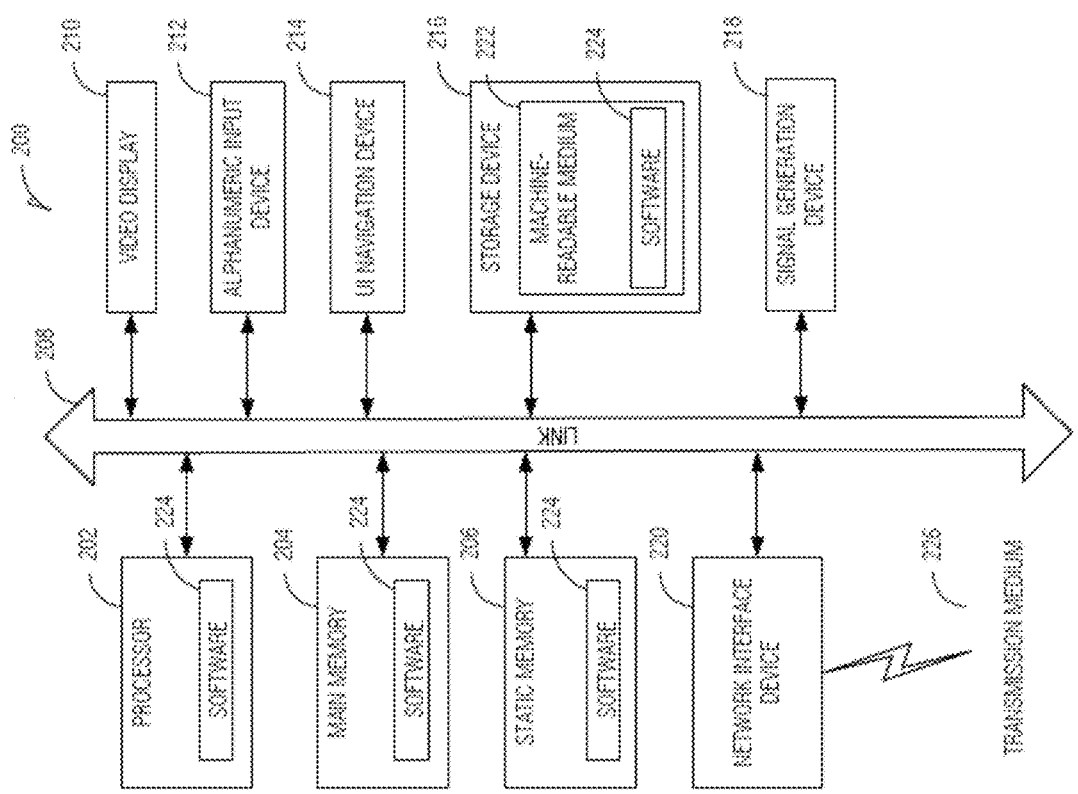
FIG. 2 illustrates a block diagram of a communication device in accordance with some embodiments.

FIG. 2 illustrates a block diagram of a communication device in accordance with some embodiments. In some embodiments, the communication device may be a UE (including an IoT device and NB-IoT device), eNB, gNB or other equipment used in the network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, interne protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), which may communicate with the core network via the eNB or gNB shown in FIG. 1. The IoT device may be an autonomous or semiautonomous device that performs one or more functions, such as sensing or control, among others, in communication with other IoT devices and a wider network, such as the Internet. The IoT device, in some embodiments may be limited in memory, size, or functionality, allowing larger numbers to be deployed for a similar cost to smaller numbers of larger devices. In other embodiments, however, the IoT device may be a smart phone, laptop, tablet, or PC, or other larger device. The IoT device may, in some embodiments, be a virtual device, such as an application on a smart phone or other computing device. IoT devices may include IoT gateways, used to couple IoT devices to other IoT devices and to cloud applications, for data storage, process control, and the like. IoT devices (or groups of IoT devices) may be accessible through remote computers, servers, and other systems, for example, to control systems or access data. A group or set of IoT devices that are connected to one another using wired and/or wireless technologies may be referred to as a "network of IoT devices," an "IoT network," or the like.

As above, networks of IoT devices may be used for a wide variety of applications in various deployment scenarios, including commercial and home automation, smart factories or smart manufacturing, smart cities, smart environment, smart agriculture, and smart health systems. For example, IoT networks may be used for water distribution systems, electric power distribution systems, pipeline control systems, plant control systems, light switches, thermostats, locks, cameras, alarms, motion sensors, and the like.

3GPP has standardized two designs to support IoT services—enhanced Machine Type Communication (eMTC) and NarrowBand IoT (NB-IoT). As eMTC UEs and NB-IoT UEs continue to be deployed in increasing numbers, lowering the cost of eMTC UEs and NB-IoT UEs may be one enabler for implementation of IoT. Also, low power consumption may be one desirable to extend the life time of the battery. In addition, in some use cases of the eMTC UEs and NB-IoT UEs may be deployed deep inside buildings. In such cases, the eMTC UEs and NB-IoT UEs may employ coverage enhancement in comparison to the defined LTE cell coverage footprint.

As above, both Release (Rel)-13 eMTC and NB-IoT UEs may operate in licensed spectrum but may experience a decrease in data rate due to the scarcity of licensed spectrum in low frequency band. Thus, there are emerging interests in the operation of LTE systems in unlicensed spectrum. LTE operation in unlicensed spectrum includes Carrier Aggregation (CA) based on Licensed Assisted Access (LAA)/enhanced LAA (eLAA) systems, LTE operation in the unlicensed spectrum via dual connectivity (DC), and a standalone LTE system in the unlicensed spectrum, where LTE-based technology solely operates in unlicensed spectrum without use of an "anchor" in licensed spectrum, which is called the MulteFire system. To extend the benefits of LTE IoT designs into unlicensed spectrum, MulteFire 1.1 is expected to specify the design for Unlicensed-IoT (U-IoT).

The target band for narrowband unlicensed IoT is the sub-1 GHz band for the United States (US), European Union (EU), and China. However, the embodiments herein may be applicable to other frequency bands. Regulation defines the operation of such a system for either digital modulation or frequency hopping. Digital modulation may use a system bandwidth that is greater than 500 KHz with a power spectral density (PSD) limitation of 8 dBm/3 kHz. Frequency hopping instead may have limitations on the duty cycle, as well as the number of hops. In particular, the number of hops may be correlated to the maximum transmission power.

In the EU, for the above band, four new sub-channels have been proposed to be used. These sub-channels are: 865.6 MHz~865.8 MHz, 866.2 MHz~866.4 MHz, 866.8 MHz~867.0 MHz, 867.4 MHz~867.6 MHz. In the EU, the regulation regarding these sub-channels states that: 1) the maximum Equivalent Isotropically Radiated Power (EIRP) is 27 dBm; 2) adaptive power control is required; 3) the bandwidth is smaller than 200 kHz; 4) the duty cycle for network access points is smaller than 10%, while for other devices the duty cycle is 2.5%. While operating a NB-IoT system in this band as a digital modulation system is appealing, operating as a frequency hopping system may provide additional benefits: frequency diversity may be exploited by operating the system as frequency hopping system, while the initial access timing might be longer. In addition, digital modulation with 3 resource blocks may have the same transmit (Tx) power as frequency hopping with 1 resource block, which translates in a loss in terms of coverage of about ~5 dB.

Since digital modulation may be able to provide better performance than frequency hopping from the capacity point view, digital modulation may be able to provide a larger coverage area and better capacity than frequency hopping. Uplink (UL) and downlink (DL) transmissions may be decoupled to optimize the system based on the Rel-13 Frequency Domain Duplex (FDD) system and Rel-15 Time Domain Duplex (TDD) system to satisfy regulations in one or more of the different jurisdictions and enhance initial access.

In some embodiments, when the DL and UL is decoupled, the DL system may be certified as the digital modulation while the UL system is certified as the frequency hopping spread spectrum (FHSS). The system can be either single carrier or multiple carrier. For DL, an additional carrier can be added, and the offset for this carrier may be signaled by an eNB through higher layer signaling, such as radio resource control (RRC) signaling. For UL, if the additional offset is added, the additional offset may be utilized to generate the frequency hopping pattern. The frequency of DL carriers/physical resource blocks (PRBs) can be either overlapped or non-overlapped with the UL carriers/PRBs.

Figure 3:
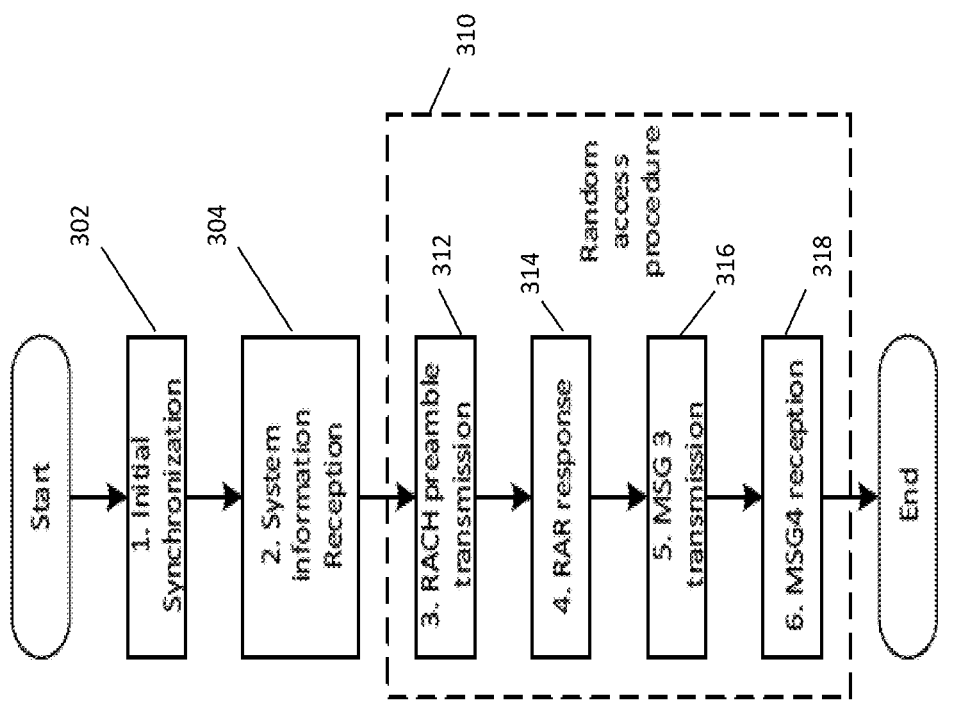
FIG. 3 illustrates an initial access procedure in accordance with some embodiments.

As above, the UE may perform an initial access procedure to connect with the radio access network (cell), which may be an eNB or gNB. FIG. 3 illustrates an initial access procedure in accordance with some embodiments. The initial access procedure may be performed using the unlicensed spectrum. When UE starts the initial access, the UE may first perform an initial synchronization by detecting primary synchronization signals (PSS) and secondary synchronization signals (SSS) at operation 302 to obtain the cell identity and frame timing. The PSS may provide slot timing and Physical Layer ID; the SSS may provide the physical layer cell identity group number for Radio Frame Timing detection, Physical Layer Cell ID, cyclic prefix length, FDD or TDD determination.

The UE may then obtain the system information during reception of the Physical Broadcast Channel (PBCH) in the SSB, which may carry the master information block (MIB) and, in some cases, system information blocks (SIBs) of the cell at operation 304. The UE may obtain random access procedure configuration information from the PBCH. The PSS (1 symbol) and SSS (1 symbol) and PBCH (2 symbols) may be provided in a Synchronization Signal Block (SSB). One or more SSBs may be transmitted in an SSB burst that is itself transmitted within an SS Burst Set that contains one or more SSB bursts of 5 ms (default). The periodicity of the SS Burst Set may be 20 ms. The number of possible candidate SSB locations within SS Burst Set may be dependent on the frequency: 4 locations up to 3 GHz, 8 from 3 GHz to 6 GHz, and 64 from 6 GHz to 52.6 GHz.

After obtaining the random access procedure configuration information, the UE may perform a random access procedure at operation 310. The random access procedure may include the UE initially transmitting a physical random channel (PRACH) (Msg-1) at operation 312 and attempting to receive a random access response (RAR) (Msg-2) in a physical downlink shared channel (PDSCH) at operation 314. The PRACH (xPRACH in NR) may carry a random access preamble from the UE towards the RAN. The PRACH may use the random access Radio Network Temporary Identifier (RA-RNTI) and a selected Preamble Index. The PRACH may be sent at the time and frequency location determined from the RACH parameters in SIB2.

The preamble may be generated using Zadoff Chu (ZC) sequences. The preamble, if received by the RAN, may adjust uplink timing for message transmission by the UE, in addition to other parameters. The 5G NR random access preamble supports two different sequence lengths with various format configurations (Format 0, Format 1, Format 2, Format 3, Format A1, Format A2, Format A3, Format B1, Format B2, Format B3, Format B4, Format C0, Format C1). An 839 long preamble sequence is used by four preamble formats (0-3) that are designed for large cell deployment in the sub-6 GHz range (FR1) and have a subcarrier spacing of 1.25 KHz or 5 KHz; a 139 short preamble sequence is used by nine preamble formats (A-C) that are designed for small cell deployment/beam sweeping in both the FR1 range with a 15 or 30 KHz subcarrier spacing and mmwave (FR2) range (i.e., above 6 GHz) with a 60 or 120 KHz subcarrier spacing. There may be 64 preambles defined in each time-frequency PRACH occasion.

If no RAR is received by the UE inside a predefined (or configured) time window, the UE may retransmit the PRACH with increasing power until the UE receives the RAR. If the UE receives the RAR, the UE may then transmit Msg-3 (RRC Connection Request) at operation 316 using the resources indicated by the RAR and may receive Msg-4 (Contention Resolution, carrying the acknowledgment (ACK)+Contention Resolution ID (CRID)) at operation 318, at which point the initial access procedure ends.

Figure 4:
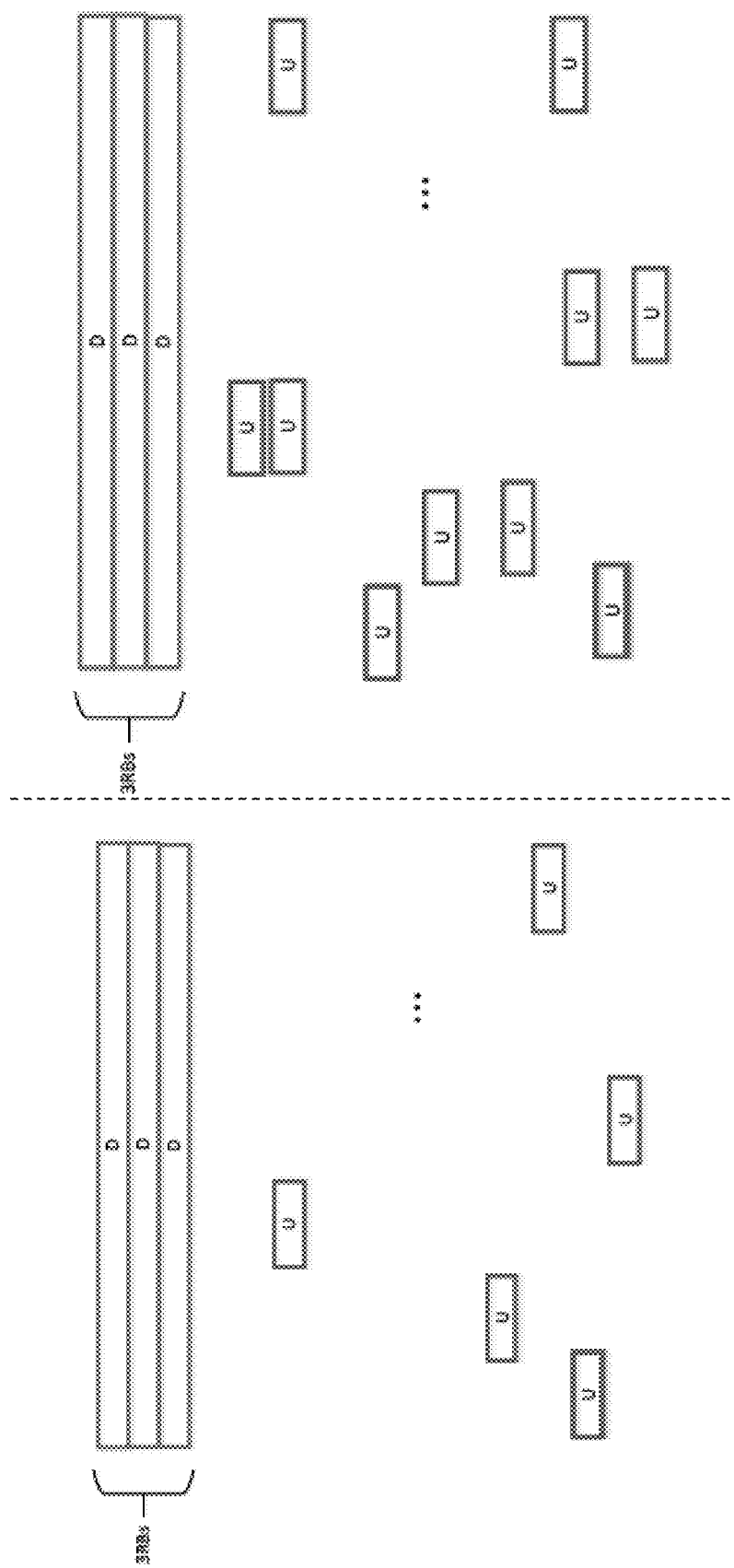
FIG. 4A illustrates an example of a frame structure in accordance with some embodiments.
FIG. 4B illustrates an example of another frame structure in accordance with some embodiments.

The UL and DL carriers used to convey information, including the initial access information, may be different depending on the embodiment. FIG. 4A illustrates an example of a frame structure in accordance with some embodiments. The frame structure in FIG. 4A uses single UL carrier. FIG. 4B illustrates an example of another frame structure in accordance with some embodiments. The frame structure in FIG. 4B uses multiple UL carriers. The frame structure shown in FIGS. 4A and 4B, like those in other figures, are frame structure type 3N, which may be applicable to multefire NB-IoT cells with normal cyclic prefix. Each radio frame may be 10 ms long and have 20 slots of length 0.5 ms, numbered from 0 to 19. A subframe may be defined as two consecutive slots where subframe i has slots $2i$ and $2i+1$. Two specific frame structures with different Discovery Reference Signal (DRS) period $T_{MF-NDRS}$ are supported, where $T_{MF-NDRS}=8$ radio frames for frame structure type 3N1 and $T_{MF-NDRS}=128$ radio frames for frame structure type 3N2. One DRS period may be partitioned into two segments: an anchor segment and a data segment, where the DRS may be included in the anchor segment. The anchor segment may contain two radio frames and start at radio frames satisfying $n_f \mod T_{DRS}=0$ The data segment may contain the remaining $T_{MF-NDRS}=2$ radio frames.

The carriers shown in FIGS. 4A and 4B, like all other carriers shown in the figures herein, may be on the unlicensed band. In both the embodiments of FIG. 4A and 4B, the frequency axis is shown as the y-axis and the time axis is shown as the x-axis. In particular, FIG. 4A illustrates that only a single RB over the spectrum at a particular time may be used for UL transmission by the UE, while FIG. 4B, on the other hand, illustrates that multiple RBs over the spectrum may be used at the same time for UL transmission by the UE. As shown in FIG. 4B, the RBs may have different frequency separations dependent on the time period of transmission.

Figure 5:
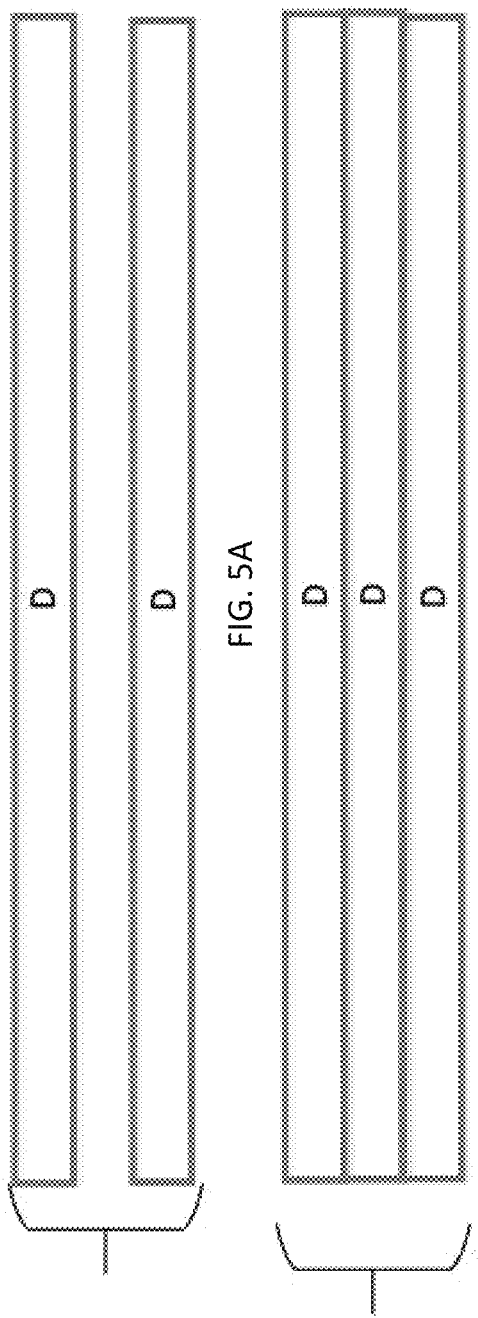
FIG. 5A illustrates one example of DL segments in accordance with some embodiments.
FIG. 5B illustrates another example of DL segments in accordance with some embodiments.

FIGS. 5A and 5B illustrate examples of DL segments in accordance with some embodiments. In the embodiment shown in FIG. 5A, a pair of PRBs used for DL transmission are shown. The pair of PRBs are non-contiguous in frequency. In the embodiment shown in FIG. 5B, multiple PRBs used for DL transmission are shown. Specifically, FIG. 5B shows 3 PRBs contiguous in frequency used for DL transmission. The eNB may select an implementation to choose one RB to transmit the initial access information (NPSS/NSSS/NPBCH). The RB selected for transmission of the initial access information may be the anchor RB or anchor carrier. Alternatively, the anchor carrier can be fixed on the PRB with the largest index or the smallest index.

SIB1 can also be transmitted on the anchor carrier. Alternatively, SIB1 may be transmitted using a different carrier than the anchor carrier. In this latter case, a one or two bit carrier offset indicator can be added to the MIB. If a one bit carrier offset indicator is used, for example, "0" may be used to indicate no offset and "1" may be used to indicate an offset, where the offset can be $\pm\frac{1}{2}$. If a two bit carrier offset indicator is used, for example, "00" may be used to indicate no offset, "01" may be used to indicate a $-\frac{1}{2}$ offset, "10"

may be used to indicate a +½ offset, and "11" may be reserved. Other SIB-x can be transmitted either using the anchor carrier or a non-anchor carrier according to the scheduling indicated by SIB1.

Figure 6:
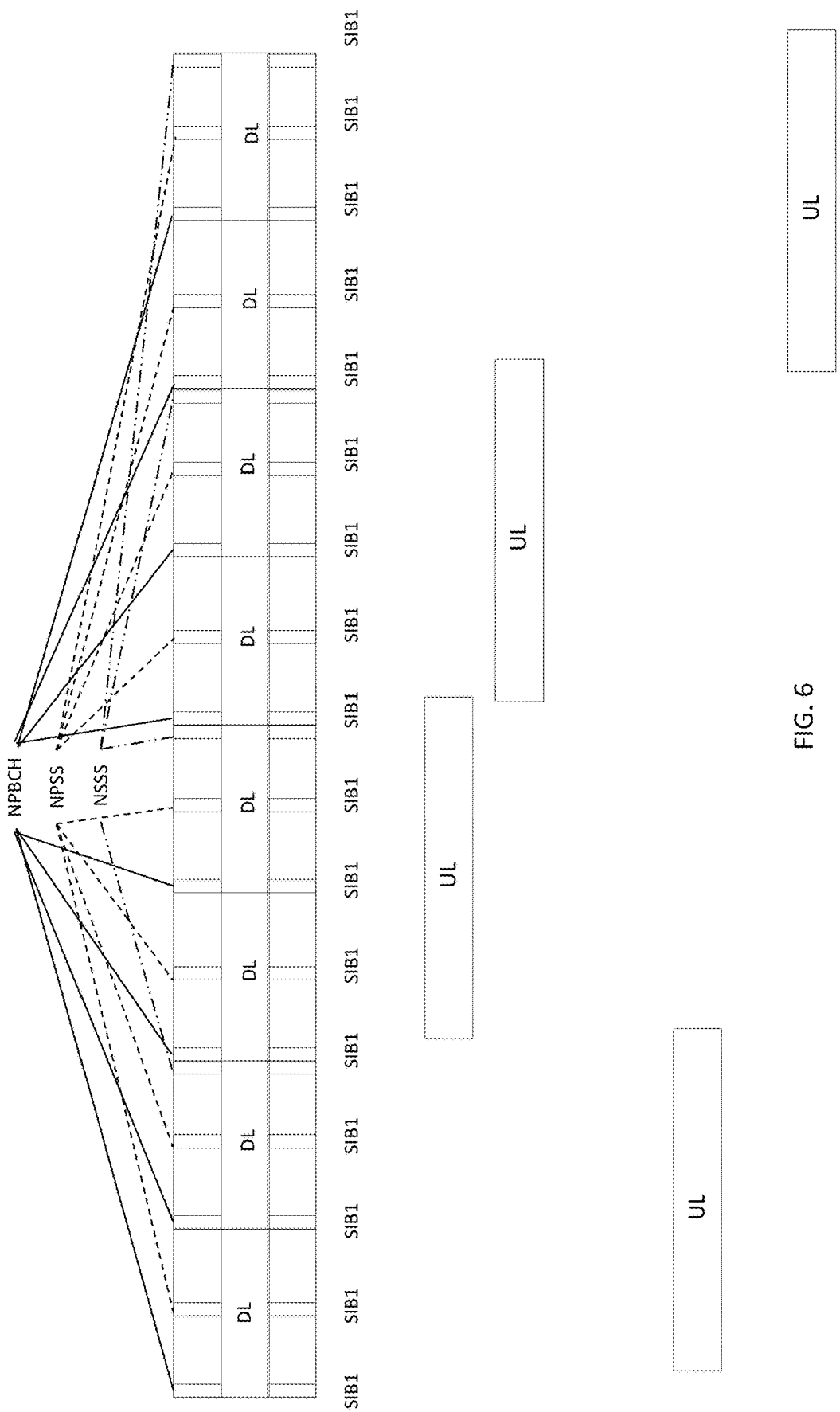
FIG. 6 illustrates initial access information transmission in accordance with some embodiments.

The initial access information may be periodically transmitted on specified subframes. FIG. 6 illustrates initial access information transmission in accordance with some embodiments. For example, the NPSS may be transmitted in subframe 5 every 10 ms, the NSSS may be transmitted in subframe 9 every 20 ms, and the NPBCH may be transmitted in subframe 0 every 10 ms. In some embodiments, like SIB1, the NPSS/NSSS/NPBCH can be transmitted using different carriers. For example, the NPSS/NPBCH may be transmitted on the anchor carrier at subframe 5/0 every 10 ms—e.g. the RB with the largest or smallest RB index. The NSSS may be transmitted on subframe 9 every 20 ms. SIB1 may be transmitted on another RB, which has a gap that corresponds to the anchor RB. In this case, SIB1 may be transmitted on the same subframe as the NPSS/NPBCH/NSSS; that is, SF0/5 every 10 ms, and subframe 9 every 20 ms.

Figure 7:
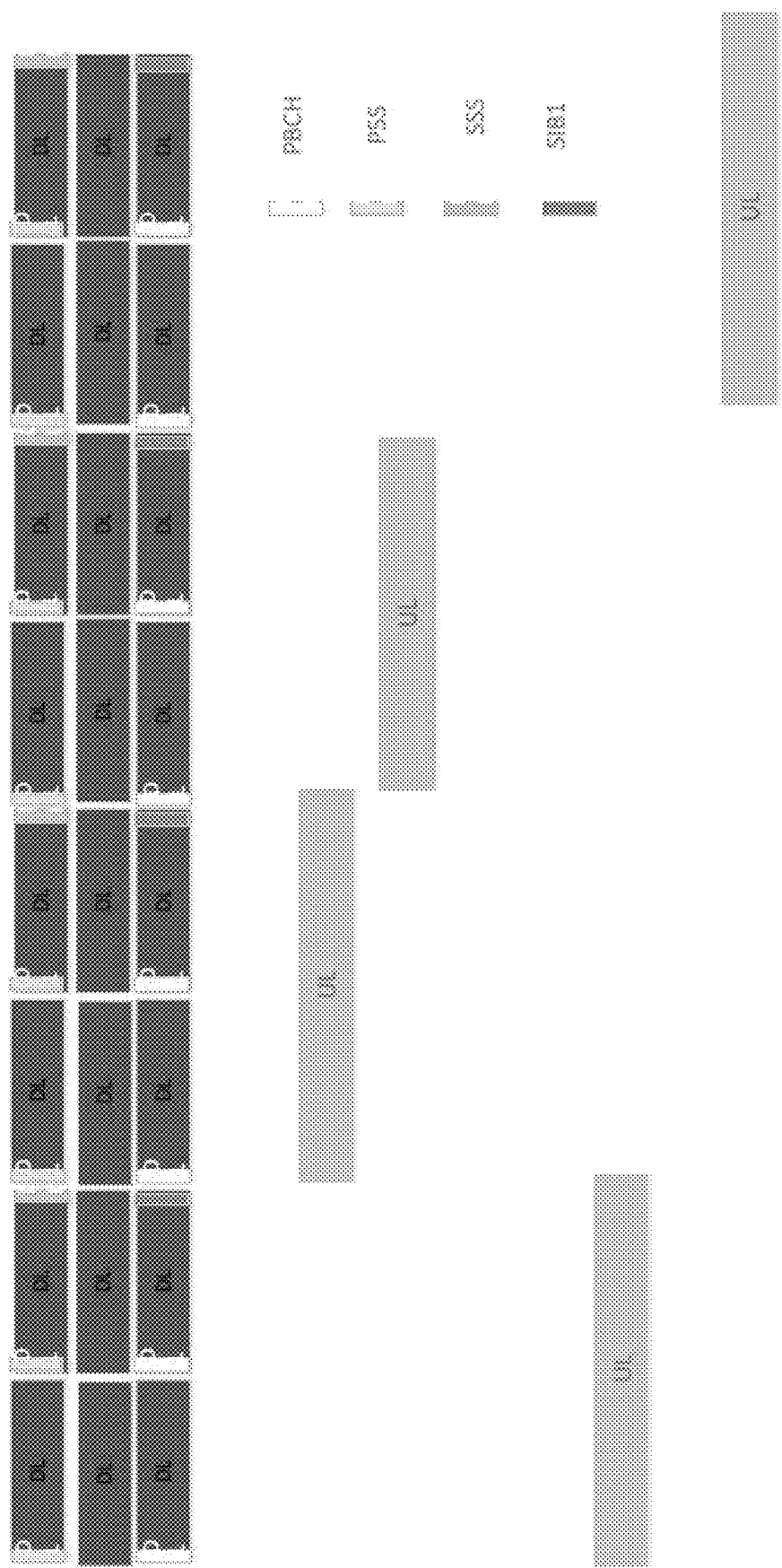
FIG. 7 illustrates initial access information transmission with Physical Broadcast Channel (PBCH) offset in accordance with some embodiments.

FIG. 7 illustrates initial access information transmission with NPBCH offset in accordance with some embodiments. In this figure, the periodicity of the NPSS/NSSS/NPBCH transmissions may be the same as in FIG. 6, but the subframes used for one or more of the transmissions may differ. For example, as shown in FIG. 7, the NPSS may be transmitted on the anchor carrier in subframe 0 every 10 ms, the NSSS may be transmitted in subframe 9 every 20 ms. A secondary anchor carrier, however, may be used to transmit the NPBCH as well as SIB1. As shown, the secondary anchor carrier may have a one RB offset from the anchor channel. As in FIG. 6, the NPBCH may be transmitted in subframe 0 every 10 ms, while SIB1 may be transmitted at subframe 9 every 20 ms.

Figure 8:
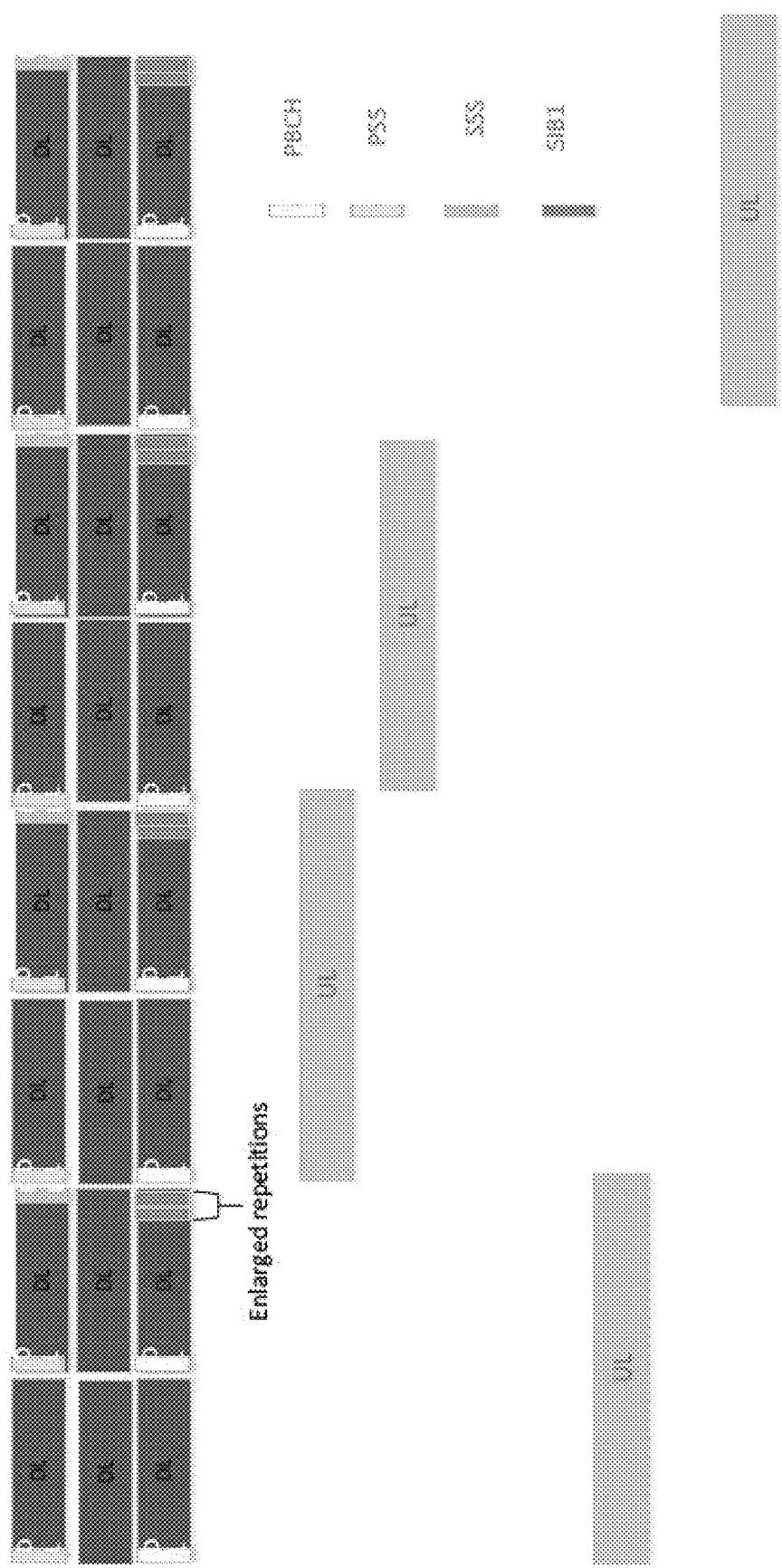
FIG. 8 illustrates initial access information transmission with replicated System Information Broadcast1 (SIB1) transmissions in accordance with some embodiments.

In some embodiments, the repetition times of SIB1 may be configured by MIB. FIG. 8 illustrates initial access information transmission with replicated SIB1 transmissions in accordance with some embodiments. The minimum SIB1 transmission (i.e., maximum period between SIB1 transmissions) may be 20 ms in subframe 9. If an increased number of repetitions of SIB1 is configured, SIB1 can be transmitted in the previous subframe (subframe 8) for doubled SIB1 density, in subframe 6, 7 and 8 for 4 times SIB1 density. The corresponding subframes on the anchor channel can be utilized to transmit SIBx (SIBs other than SIB1) or a unicasted DL transmission.

In some embodiments, the SIB1 transmission may reuse the Rel-13 distributed SIB1 transmission. That is, the use of subframe 4 and the radio frame may be determined by the Physical Cell Identifier (PCI). Additionally or alternatively, a SIBx transmission can reuse the Rel-13 SIBx transmission rule. In some embodiments, a unicast narrowband Physical Downlink Control Channel and/or narrowband Physical Downlink Shared Channel (NPDCCH/NPDSCH) may be limited to be transmitted on only a non-anchor carrier. In other embodiments, the NPDCCH/NPDSCH may be permitted to be transmitted on either an anchor carrier or a non-anchor carrier.

In some embodiments, the NPSS/NSSS/NPBCH/SIB1 can be packed together to have a unified structure as the EU. In such embodiments, the NPSS may be transmitted in subframe 0 every 10 ms; the NPBCH may be transmitted in subframe 1 every 10 ms; the NSSS may be transmitted in subframe 2 every 20 ms in the first radio frame; and/or SIB1 may be transmitted in subframe 2 every 20 ms in the second radio frame for maximum repetitions. This permits the density of SIB1 transmissions to be further reduced.

It is not only to Rel-13 transmissions that the above may be employed; the timing and periodicity may be used in narrowband transmissions of the Rel-15 TDD system may be similar. In the Rel-15 TDD system, the subframe used by narrowband NPSS (NPSS), narrowband NSSS (NSSS) and narrowband NPBCH (NPBCH) may be transmitted as follows: NPSS in subframe 5 in every radio frame; NSSS in subframe 0 in every even-numbered radio frame; and/or NPBCH in subframe 9 in every radio frame. The NPBCH may be transmitted on the same carrier as the NPSS/NSSS transmission.

In systems designed for use in the EU, in some embodiments, both system broadcasting information and unicasted data transmission may be transmitted in the anchor carrier. In a first embodiment for EU systems, the Rel-15 TDD NPSS/NSSS/NPBCH can be reused. That is, the NPSS may be transmitted in subframe 5 in every radio frame, the NSSS may be transmitted in subframe 0 in every even-numbered radio frame, the NPBCH may be in subframe 9 in every radio frame on the same carrier as the NPSS/NSSS, and SIB1 may be transmitted in subframe 0, where the radio frame number may depend on the number of times of repetition.

In a second embodiment for EU systems, the Rel-13 TDD NPSS/NSSS/NPBCH can be reused. That is, the NPSS may be transmitted in subframe 5 every 10 ms, the NSSS may be transmitted in subframe 9 every 20 ms, the NPBCH may be transmitted in subframe 0 every 10 ms, and SIB1 may be transmitted in subframe 4. As above, the radio frame number for the SIB1 transmission may depend on the number of times of repetition.

Note that in EU systems there is a 10% Dual Connectivity (DC) limitation. Because of this limitation, in a third embodiment for EU systems, the overhead of NPSS/NSSS/NPBCH/SIB1 may be 30%, accounting the other SIBx transmissions. This results in the available DL transmission for unicast data transmission being limited. To avoid this, the period of the NPSS/NSSS/NPBCH/SIB may be enlarged by 6 or 8 or 12 times, to reduce the DC respectively to 5%/3.75%/2.5%. That is, the NPSS may be transmitted in subframe 5 every 60/80/120 ms, the NSSS may be transmitted in subframe 9 every 120/160/240 ms, the NPBCH may be transmitted in subframe 0 every 60/80/120 ms, the SIB1 may be transmitted in subframe 4 every 120/160/240 ms for a repetition of 16. As above, the radio frame number for the SIB1 transmission may depend on the number of times of repetition.

In a fourth embodiment for EU systems, to avoid frequent downlink and uplink switching, the NPSS/NSSS/NPBCH/SIB1 transmissions may be packed into contiguous DL subframes. That is, the NPSS may be transmitted in subframe 0 very 80 ms at the first radio frame; the NPBCH may be transmitted in subframe 1 every 80 ms at the first radio frame; the NSSS may be transmitted in subframe 2 every 160 ms at the first radio frame; and/or SIB1 may be transmitted in subframe 2 every 160 ms for maximum repetition, at the second/third/fourth/fifth radio frame dependent on the cell ID. The density of SIB1 transmissions can be further reduced for a smaller repetition. In this case, the overhead of NPSS/NSSS/NPBCH/SIB1 may be reduced to 3.75%.

In another embodiment, the overhead of the NPSS/NSSS/NPBCH/SIB1 transmissions can be further reduced to 1.87%. That is, the NPSS may be transmitted in subframe 0 every 160 ms at the first radio frame; the NPBCH may be transmitted in subframe 1 every 160 ms at the first radio frame; the NSSS may be transmitted in subframe 2 every 320 ms at the first radio frame; and/or the SIB1 may be transmitted in subframe#2 every 320 ms for 16 repetitions. The SIB1 transmission may be at the second/third/fourth/fifth radio frame for different cell IDs. The density of the SIB1 transmission can be further reduced for smaller repetition, e.g. in subframe 2 every 640 ms for reduced maximum repetition/2.

In one embodiment, the NPSS/NSSS/NPBCH/SIB1 transmissions can override the DL/UL configuration indicated by SIB1 or SIB2. In one embodiment, scheduling the unicast downlink transmission to satisfy the 10% DC may be up to the eNB implementation.

In one embodiment, the NPSS/NSSS/NPBCH/SIB1 transmissions may be transmitted reusing the Rel-13 TDD system. The NPSS/NSSS/NPBCH/SIB1 transmissions may be based on an eNB-configured bitmap for a valid DL configuration to satisfy the 10% DC regulation. The non-valid DL resources in subframe can be referred as the UL resources in the subframe.

Figure 9:
FIG. 9 illustrates uplink transmission in accordance with some embodiments.

FIG. 9 illustrates uplink transmission in accordance with some embodiments. In embodiments for Federal Communication Commission (FCC) (US) systems, 64 channels are used for frequency hopping for uplink transmissions. In such embodiments, the downlink and uplink resources may be overlapped in the time domain. Additionally, the channel list may be configured through the MIB. When the eNB schedules the UE to transmit the uplink data, the UE may account for the timing offset and then switch to the uplink channel according to the frequency hopping pattern.

As above, in some circumstances digital modulation may be able to provide better performance than frequency hopping. However, additional regulations may also exist that may limit the system design when digital modulation is used. For example, one regulation requires the DL system bandwidth to be at least 500 KHz when digital modulation is used. Some embodiments herein may thus be directed to a valid DL subframe and configured valid subframe so that a UE can realize the initial RACH procedure described above.

Figure 10:
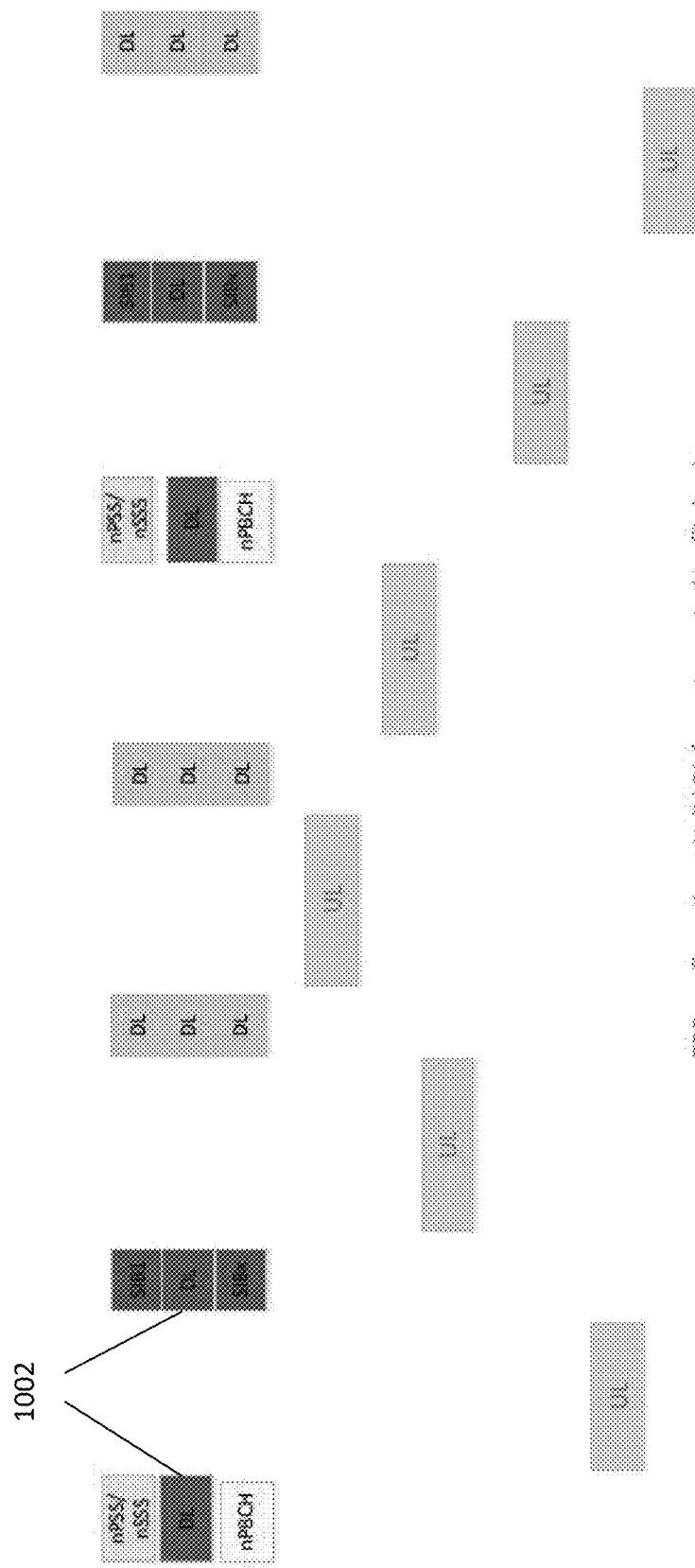
FIG. 10 illustrates a valid unlicensed frame structure in accordance with some embodiments.

FIG. 10 illustrates a valid frame structure in accordance with some embodiments. In particular, FIG. 10 shows a frame structure for an unlicensed NB-IoT TDD system that is certified under the digital modulation rule. As shown, at least three RBs are transmitted at the same time. In one embodiment, the anchor timing may be 10 ms, which may override the DL/UL configuration indicated by SIB1 or SIB2. Data transmission may also have an independent timing. During this timing, whether a subframe is downlink or uplink may be configured by the eNB or gNB using, e.g., 20 ms as the DL/UL period.

In some embodiments, new DL/UL configurations can be introduced for frame structures 3N1 and/or 3N2, including: 2 DL+18 UL ($1^{st}$ 2 subframes DL, remaining UL), 4 DL+16 UL ($1^{st}$ 4 subframes DL, remaining UL), or 4 DL+36 UL ($1^{st}$ 4 subframes DL, remaining UL).

In some embodiments, multiple types of DL subframes may be used during the configured DL subframes. One DL subframe type is an always-valid DL subframe. For always-valid DL subframes, the eNB may guarantee that a 3RB DL transmission is always transmitted at a predetermined timing. As illustrated in FIG. 10, the middle RBs of the 10 DL subframes 1002 having the timing of NPSS/NSSS/NPBCH can be referred to as the always-valid DL subframes. The UE can monitor the always-valid DL subframes for reception.

Another type of DL subframe may be configured valid DL subframes. In this case, rather than always-valid DL subframes being predetermined, the eNB may configure a valid DL bitmap through high layer signaling, e.g., in SIB1. The use of a single bit to correspond to the UL subframe or always-valid DL subframe may be lacking in utility. However, the single bit may correspond to the DL subframe according to an eNB-configured DL/UL configuration. In this case, for example, "1" may mean the subframe is a valid DL subframe that can be utilized by UE for downlink reception, while "0" may mean the subframe is a non-valid DL subframe that may not be utilized for downlink reception. In this case, the valid DL subframe bitmap can be equal to the dwell length, e.g., 20 ms, or cross multiple dwell timing.

Using a valid DL subframe configuration may permit the eNB to optimize the spectrum efficiency according to the traffic load condition. If there is light DL traffic load, the eNB can either change the DL/UL configuration or re-configure the valid subframes so that a bandwidth larger than the 500K bandwidth can be certified under the same conditions.

Figure 11:
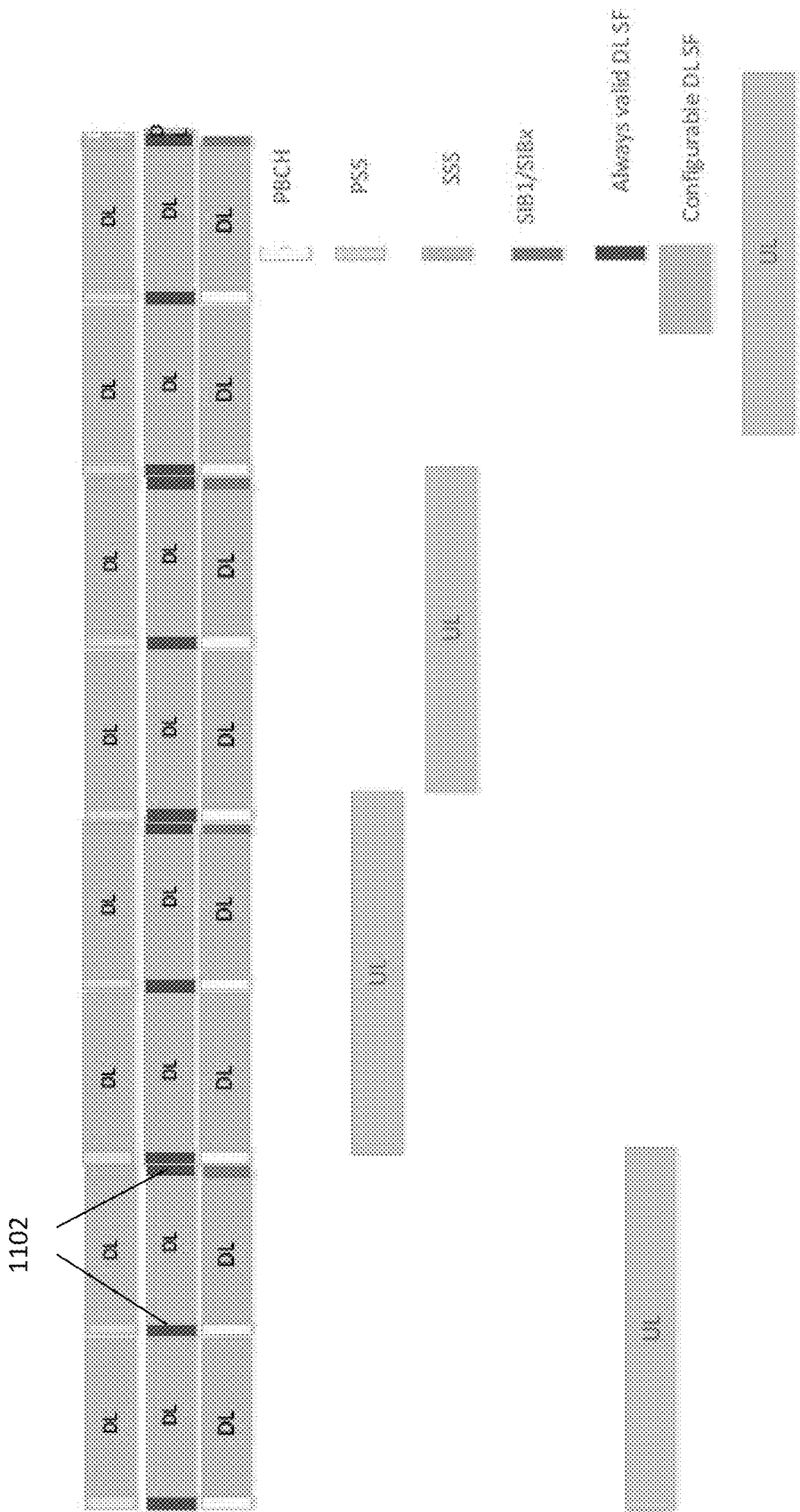
FIG. 11 illustrates an unlicensed band frame structure in accordance with some embodiments.

FIG. 11 illustrates an unlicensed band frame structure in accordance with some embodiments. The unlicensed NB-IoT system may be a half-duplex FDD (HD-FDD) system. The unlicensed band frame structure may contain one or both always-valid DL subframes and configured valid DL subframes. The unlicensed band frame structure may be certified under the digital modulation rule as at least three RBs are transmitted at the same time.

In some embodiments, no guaranteed DL/UL subframe may be present. The UE may thus switch to UL transmission when there is a UL scheduling grant from the RAN.

As above, in some embodiments, the DL subframes can be divided into two groups: always-valid DL subframes and configured valid DL subframes. For always-valid DL subframes, the eNB may guarantee that a 3RB DL transmission is always transmitted at a particular timing. As illustrated in FIG. 11, the middle RBs of the DL subframes 1102 having the timing of the NPSS/NSSS/NPBCH transmission and/or the SIB1/SIBx/NSSS transmission, may be the always-valid DL subframes. The UE can monitor the always-valid DL subframes for reception.

The eNB may configure a valid DL bitmap through high layer signaling, e.g., in SIB1, to provide configured valid DL subframes. The use of a single bit may correspond to the DL subframe according to an eNB-configured DL/UL configuration. In this case, for example, "1" may mean the subframe is a valid DL subframe that can be utilized by UE for downlink reception, while "0" may mean the subframe is a non-valid DL subframe that may not be utilized for downlink reception. In this case, the valid DL bitmap may be applied to the three DL RBs.

In some embodiments, besides the NPSS/NSSS/NPBCH/SIB1/SIBx subframes, both the eNB and the UE can assume the presence of an always-on narrowband reference signal (NRS) to guarantee there are sufficient valid DL subframes to undertake the RACH procedure. As above, at the initial stage of the RACH procedure, the UE may first detect the NPSS/NSSS/NPBCH/SIB1 transmission, as well as other essential SIBx information. The UE may then obtain the always-valid DL subframes, as well as the configured valid DL subframes. The RACH procedure may be performed on the middle RBs in either the always-valid downlink subframes, or always-valid plus configured DL subframes. For instance, the UE can monitor the RAR/Msg3 retransmission (ReTx)/Msg4 and other NPDCCH channels before RRC connection setup. The corresponding NPDSCH transmission can be on the same RB as the NPDCCH transmission. Alternatively, there may be an RB offset in the downlink control information (DCI) to indicate that the NPDCCH and the NPDSCH are transmitted using different RBs.

Figure 12:
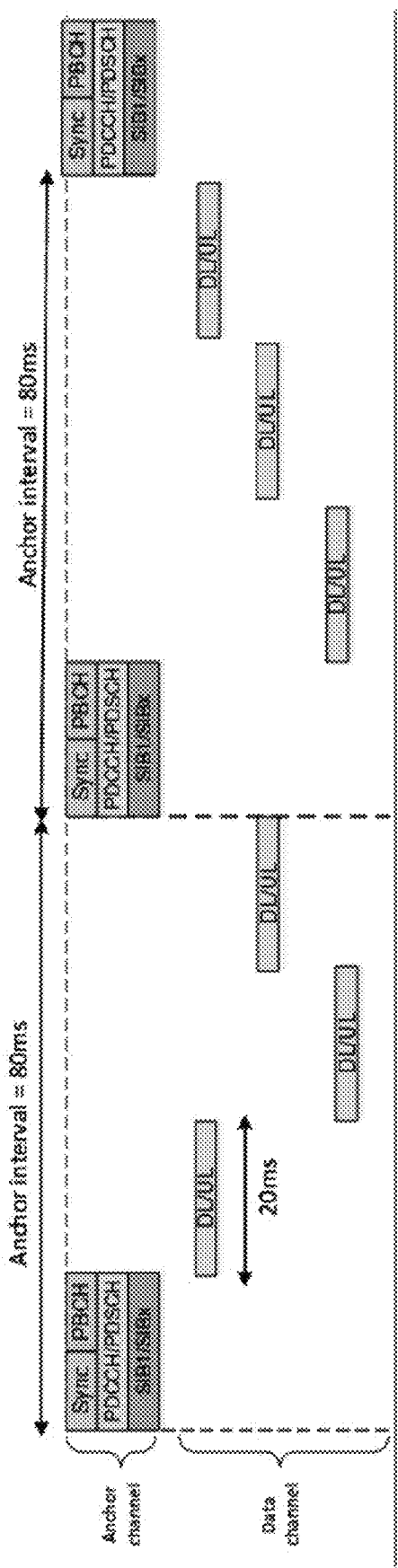
FIG. 12 illustrates an unlicensed frame structure in the United States (US) in accordance with some embodiments.

FIG. 12 illustrates an unlicensed frame structure in the US in accordance with some embodiments. The frame structure shown in FIG. 12, like those in previous figures that show frame structures of FCC systems (frame structure 3N1), shows an anchor channel and data channel in the unlicensed spectrum. The anchor channel may include 3 RBs (carriers) ($N_{RB}^{DL}$32 3), each of which may be 180 kHz (12 subcarriers of 15 kHz), for a total bandwidth of >500 kHz (540 kHz). The DL transmissions on the anchor channel (the anchor segment) may be 20 ms in length, and the entire interval between anchor channel transmissions may be 80 ms.

Data channel transmissions (the data segment), whether DL or UL transmissions are scheduled by the anchor channel, may occur on a single carrier ($N_{RB}^{DL}$=1) and may take the remaining 60 ms of the 80 ms interval. The data channel transmissions may occur in 20 ms frequency hopping segments, each of which is transmitted on a different carrier, dependent on the frequency hopping sequence. The relation between the physical resource block number $n_{PRB}$ in the frequency domain and resource elements (k, 1) in anchor segment may be given by $$n_{PRB} = \left\lfloor \frac{k}{12} \right\rfloor,$$

where k=0,1,2, . . . ,$3N_{sc}^{RB}$−1.

The anchor channel may include access information having a duration of 20 ms. The access information may include a 10 ms (10 subframe) synchronization transmission on the carrier having the highest index, followed by a 10 ms NPBCH transmission on the highest index carrier. The synchronization transmission may include an 8 ms NPSS transmission followed by a 2 ms NSSS transmission.

The anchor channel may further include SIB transmissions on the carrier having the lowest index. The SIB transmissions may include a 10 ms SIB1 transmission, followed by a 10 ms set of SIBx transmissions. The SIBx transmissions may include one or more of SIB2, SIB3, etc. . . . , the type and number/timing of the different SIB transmissions may be defined by the SIB1 transmission.

The anchor channel may further include narrowband DL control and/or data signaling on the carrier having the middle index. That is, unicast NPDCCH and/or NPDSCH transmissions may be sent on the anchor channel, as well as on the data channel. Thus, the UE may monitor the NPDCCH UE-specific search space in the anchor and data channel of Frame Structure 3N1 or the NPDCCH UE-specific search space in data channel of Frame Structure 3N2. In some embodiments, the NPDSCH may not be present (or expected) in a particular subframe if the subframe is not a multefire NB-IoT downlink subframe, except for transmissions of NPDSCH carrying SIB1-NB-MF and SystemInformation-NB-MF.

Figure 13:
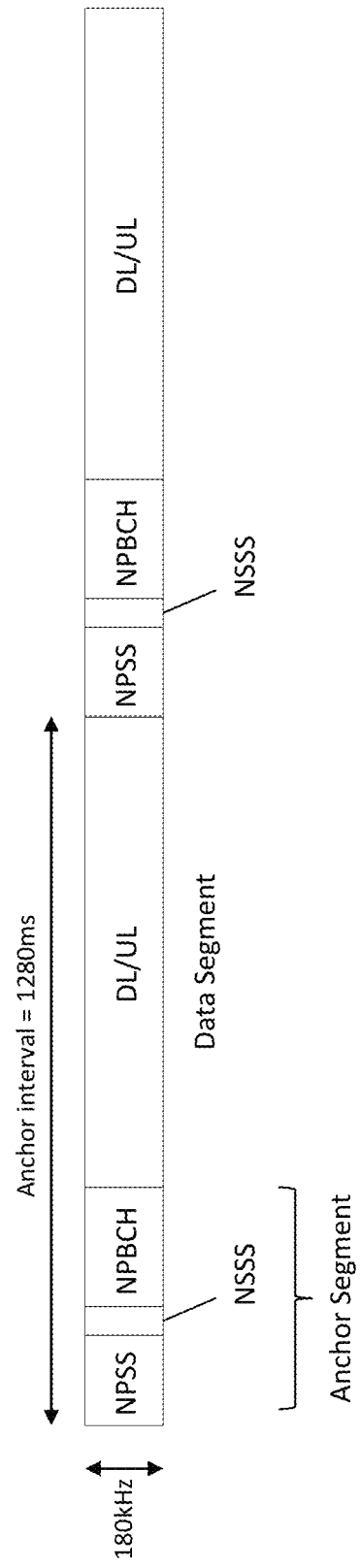
FIG. 13 illustrates a European Union (EU) unlicensed band frame structure in accordance with some embodiments.

FIG. 13 illustrates a European Union (EU) unlicensed band frame structure in accordance with some embodiments. As shown, the transmissions of frame structure 3N2 may be sent using a single carrier 180 kHz. The interval between anchor segments, however, may be substantially longer than that shown in FIG. 12. Specifically, the anchor channel timing may be 1280 ms between consecutive transmissions of the anchor segment. The anchor segment may include the transmissions of the carrier having the highest index shown in FIG. 12: an 8 ms NPSS transmission followed by a 2 ms NSSS transmission followed by a 10 ms NPBCH transmission. Due to the length of the data segment (1260 ms), the information in the NPSS may override the UL/DL configuration for transmission on the unlicensed carrier indicated by SIB1 or SIB2. The data segment may contain unicast or broadcast data.

Thus, various embodiments of the frame structures for both the FCC region (3N1) and EU region (3N2) are described. In the 3N1 frame structure, the downlink and uplink transmissions are decoupled; the downlink system is a digital modulation system (>500 kHz), while the uplink system is a frequency hopping spread spectrum system. In the 3N1 frame structure, the anchor channels contain at least three continuous DL PRBs. The eNB may use the anchor carrier with the largest index in the anchor channel on which to transmit the NPSS/NSSS/NPBCH and SIB1 and SIBx on the anchor carrier with the smallest index in the anchor channel. A unicast NPDCCH/NPDSCH may be transmitted on either anchor carrier or data carrier. The data segment transmitted on the data carrier may contain either or both system broadcast information or unicasted data. In the 3N2 frame structure (TDD) the NPSS/NSSS/NPBCH/NSIB1 can override the DL/UL configuration indicated by SIB1 or SIB2. The eNB may schedule the unicast downlink transmission to satisfy the 10% DC.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus of a multefire narrowband internet of things (NB-IoT) user equipment (UE), the apparatus comprising:

processing circuitry configured to:
  decode, from an evolved NodeB (eNB), an anchor segment on an anchor channel in an unlicensed spectrum, the anchor segment comprising access information and system information block (SIB), the anchor channel comprising contiguous narrowband anchor carriers if a first frame structure is used and a single narrowband carrier if a second frame structure is used;
  determine a narrowband Primary Synchronization Signal (NPSS), a narrowband Secondary Synchronization Signal (NSSS), and a narrowband Physical Broadcast Channel (NPBCH) from the access information, wherein if the first frame structure is used the access information is determined from one of the anchor carriers and the SIB from another of the anchor carriers; and
  communicate with the eNB during a data segment on a data channel in the unlicensed spectrum based on the access information and the SIB, wherein if the first frame structure is used the data channel is configured to frequency hop to different data carriers at predetermined intervals, and
a memory configured to store the access information and the SIB.

2. The apparatus of claim 1, wherein:
if the first frame structure is used the anchor channel comprises three 180 kHz anchor carriers and the data carrier is a single 180 kHz carrier.

3. The apparatus of claim 2, wherein:
the one of the anchor carriers has a highest index of the three anchor carriers and the other of the anchor carriers has a lowest index of the three anchor carriers.

4. The apparatus of claim 3, wherein the processing circuitry is further configured to:
decode at least one of a narrowband Physical Downlink Control Channel (NPDCCH) or narrowband Physical Downlink Shared Channel (NPDSCH) from a middle anchor carrier between the one of the anchor carriers and the other of the anchor carriers.

5. The apparatus of claim 1, wherein:
the access information comprises the NPSS, followed by the NSSS, followed by the NPBCH.

6. The apparatus of claim 5, wherein:
the NPSS has a duration of 8 ms, the NSSS has a duration of 2 ms, and the NPBCH has a duration of 10 ms.

7. The apparatus of claim 5, wherein:
information in the NPSS overrides a time division duplexing (TDD) configuration indicated by SIB1 or SIB2.

8. The apparatus of claim 1, wherein:
the SIB comprises SIB1 and SIBx, where SIBx is SIB other than SIB1, and
the SIB1 has a duration of 10 ms and the SIBx has a duration of 10 ms.

9. The apparatus of claim 1, wherein:
if the second frame structure is used, a downlink (DL)/uplink (UL) configuration is one of:
2 DL+18 UL,
4 DL+16 UL, or
4 DL+36 UL.

10. An apparatus of an eNodeB (eNB), the apparatus comprising:
processing circuitry configured to:
  encode, for transmission to a multefire narrowband interne of things (NB-IoT) user equipment (UE), an anchor segment on an anchor channel in an unlicensed spectrum, the anchor channel comprising:
    if a 3N1 frame structure is used: a narrowband Primary Synchronization Signal (NPSS), a narrowband Secondary Synchronization Signal (NSSS), and a narrowband Physical Broadcast Channel (NPBCH) in a highest index carrier of contiguous narrowband anchor carriers and system information block (SIB) in a lowest index carrier of the anchor carriers, and
    a single narrowband carrier comprising the NPSS, NSSS, NPBCH and SIB if a 3N2 frame structure is used; and
  at least one of encode a data segment to or decode the data segment from the UE on a data channel in the unlicensed spectrum, the data channel being a single carrier other than the anchor carriers of the anchor channel that is configured to frequency hop during the data segment if the 3N1 frame structure is used and the single narrowband carrier if the 3N2 frame structure is used, and
a memory configured to store information of the anchor segment.

11. The apparatus of claim 10, wherein if the 3N1 frame structure is used the processing circuitry is further configured to:
encode at least one of a narrowband Physical Downlink Control Channel (NPDCCH) or narrowband Physical Downlink Shared Channel (NPDSCH) on a middle anchor carrier between the highest index carrier of the anchor carriers and the lowest index carrier of the anchor carriers.

12. The apparatus of claim 10, wherein:
the access information comprises the NPSS, followed by the NSSS, followed by the NPBCH.

13. The apparatus of claim 12, wherein:
the NPSS has a duration of 8 ms, the NSSS has a duration of 2 ms, and the NPBCH has a duration of 10 ms.

14. The apparatus of claim 12, wherein:
information in the NPSS overrides a time division duplexed (TDD) configuration indicated by SIB1 or SIB2.

15. The apparatus of claim 10, wherein:
the SIB comprises SIM and SIBx, where SIBx is SIB other than SIB1, and
the SIB1 has a duration of 10 ms and the SIBx has a duration of 10 ms.

16. The apparatus of claim 10, wherein:
if the 3N2 frame structure is used, a downlink (DL)/uplink (UL) configuration is one of:
2 DL+18 UL,
4 DL+16 UL, or
4 DL+36 UL.

17. A non-transitory computer-readable storage medium that stores instructions for execution by one or more processors of a multefire narrowband interne of things (NB-IoT) user equipment (UE), the one or more processors to configure the UE to, when the instructions are executed:
receive from an evolved NodeB (eNB) an anchor segment on an anchor channel in an unlicensed spectrum, the anchor channel comprising:
if a 3N1 frame structure is used: a narrowband Primary Synchronization Signal (NPSS) followed by a narrowband Secondary Synchronization Signal (NSSS) and followed by a narrowband Physical Broadcast Channel (NPBCH) in a highest index carrier of contiguous narrowband anchor carriers and system information block (SIB) in a lowest index carrier of the anchor carriers, and a single narrowband carrier comprising the NPSS, NSSS, NPBCH and SIB if a 3N2 frame structure is used; and at least one of transmit data to or receive data from the eNB during a data segment on a data channel in the unlicensed spectrum, the data channel being a single carrier other than the anchor carriers of the anchor channel that is during the data segment if the 3N1 frame structure is used and the single narrowband carrier if the 3N2 frame structure is used.

18. The medium of claim 17, wherein if the FDD frame structure is used the instructions, when executed, further configure the UE to:

receive at least one of a narrowband Physical Downlink Control Channel (NPDCCH) or narrowband Physical Downlink Shared Channel (NPDSCH) on a middle anchor carrier between the highest index carrier of the anchor carriers and the lowest index carrier of the anchor carriers.

19. The medium of claim 17, wherein:
information in the NPSS overrides a time division duplexed (TDD) configuration indicated by SIB1 or SIB2.

20. The medium of claim 17, wherein:
if the 3N2 frame structure is used, a downlink (DL)/uplink (UL) configuration is one of:
2 DL+18 UL,
4 DL+16 UL, or
4 DL+36 UL.

* * * * *